March 7, 1939.  A. R. THOMPSON  2,149,561
PROCESSING APPARATUS
Filed April 25, 1936  3 Sheets-Sheet 1

INVENTOR.
Albert. R. Thompson.
BY Philip G. Minnis
ATTORNEY.

March 7, 1939.  A. R. THOMPSON  2,149,561
PROCESSING APPARATUS
Filed April 25, 1936  3 Sheets—Sheet 2
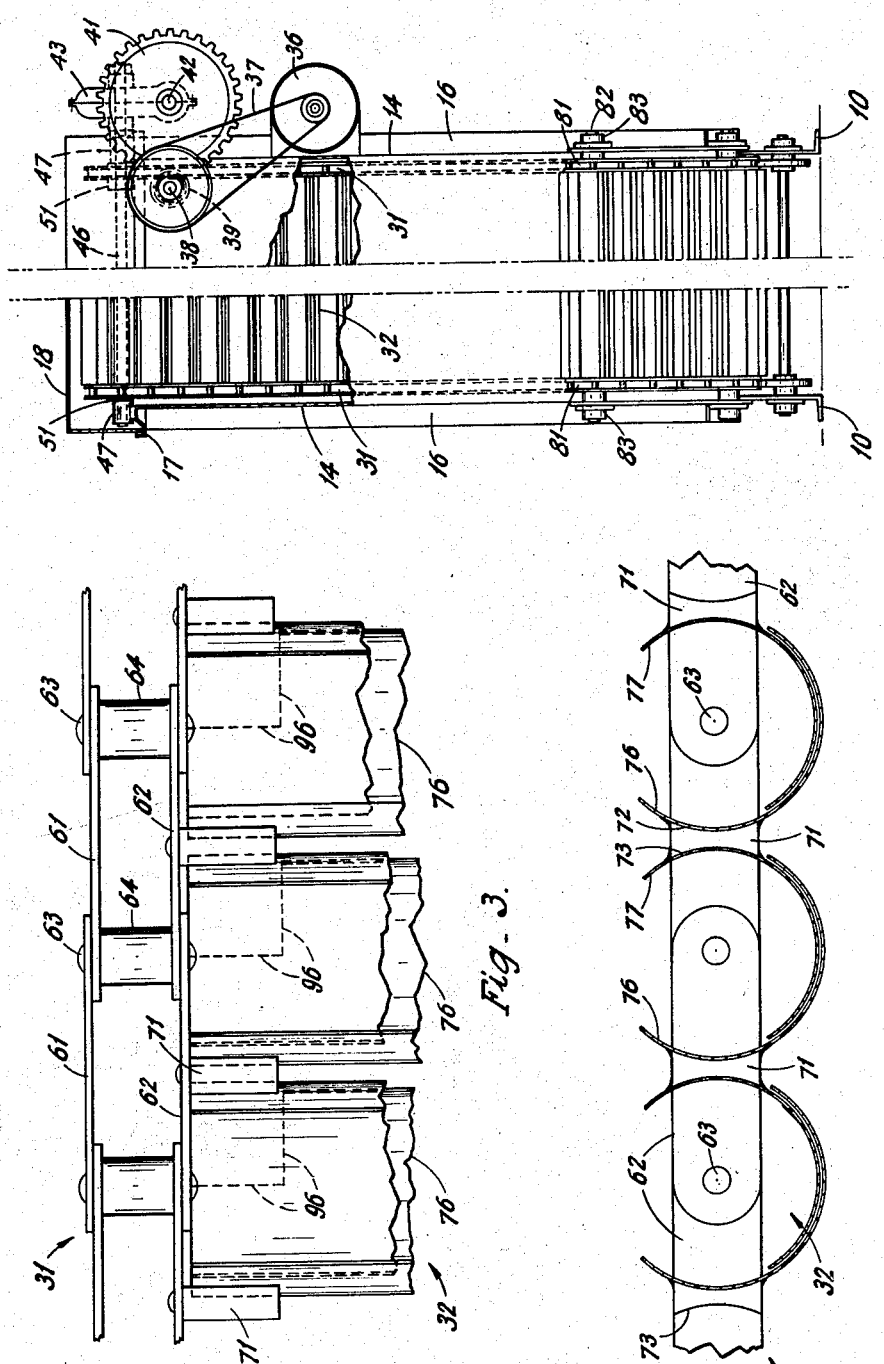
INVENTOR.
Albert R. Thompson.
BY Philip A. Minnis
ATTORNEY.

March 7, 1939.  A. R. THOMPSON  2,149,561
PROCESSING APPARATUS
Filed April 25, 1936   3 Sheets-Sheet 3

INVENTOR.
Albert R. Thompson.
BY Philip A. Minnis
ATTORNEY.

pair of idler sprockets 94 on shaft 95 mounted in brackets 83 below loading sprockets 81.

As stated above, the construction of my improved conveyer is such that the adjustment of the carriers is controlled automatically by controlling the path of movement thereof. Referring to Fig. 4, it will be noted that carrier members 76, 77 project only slightly beyond one side of chain 31, while on the other side they extend for a considerable arc and are in overlapping relation. Thus, each carrier 32 is provided with a longitudinal opening, the size of which can be varied by relative pivotal movement of carrier members 76, 77 caused by flexing of chains 31.

Preferably, in a straight position of chain 31, the size of the opening between carrier members 76, 77 is such with respect to the size of the can in the carrier that the carrier will retain the can. Consequently, if the edges of members 76, 77 which define the opening, are moved toward each other by flexing chains 31 toward the open side of the carriers, the carrier will remain adjusted to retain a can. Conversely, if chains 31 be flexed toward the closed side of the carriers, the opening will be increased to such an extent as to permit loading or discharging of cans in the carrier. To accommodate this condition of the parts, each carrier member 76 (Fig. 3) is cut away at 96 adjacent its end to prevent interference of such member 76 with lugs 71 of adjacent links of chains 31.

With the above relation of parts in mind, it will be noted with reference to Fig. 5 that chain 31 in passing over loading sprocket 81 is flexed toward the closed side of the carriers so that a wide opening is provided in each carrier when positioned at or moving past loading station F so that cans can be readily placed therein. It will be noted from the flexed condition of the links that have passed beyond loading sprocket 81 and are passing under guide member 52 that carrier members 76, 77 of each carrier are adjusted oppositely to reduce the openings therein upon flexing of chains 31 toward the open side of the carriers. It will also be noted that the straight stretch of chain 31 before reaching sprocket 81 provides for support of cans in each carrier on carrier member 77, this condition obtaining in every upwardly moving stretch of chains 31 and carriers 32 throughout the apparatus. Also, the straight stretch of chains 31 between sprocket 81 and guide member 52, 53 corresponds to every downwardly moving stretch of chain 31 and carriers 32 in which the cans are supported principally on carrier member 77 and it will be noted that in passing over sprocket 81, cans will have rolled through only 180°. The same movement of cans will occur as chains 31 and carriers 32 pass under guide members 52.

Referring to Fig. 6, a portion of chain 31 and of the attached carriers 32 are shown as they pass around a discharge sprocket 86 and the associated guide sprocket 89. It will be noted that as chain 31 moves around sprocket 86, each carrier 32 is opened widely to permit discharge of cans therefrom and is maintained fully opened through discharge position G where the opening of carrier 32 in such position faces downwardly to insure discharge of cans therefrom. This condition of the parts is attained by the relative positioning of sprockets 89 with respect to sprockets 86 so that chains 31 are doubled back on themselves in their direction of travel, and the flexed condition thereof to determine wide opening of carriers 32 is maintained through approximately 180° of the travel around sprocket 86.

From the above description of the operation of my improved conveyer, it will be seen that the carriers are automatically positioned for can loading and unloading and for can retention in accordance with a change in the direction of their path of travel and that guide members are associated therewith to determine open condition thereof at the loading station and also at the discharge station. During travel of the carriers through the processing chambers, the carriers are opened to an extent to permit removal of the cans only as they are passing over driving sprockets 51 where the opening faces upwardly and the cans cannot fall out. Thus, the carriers remain effective to retain the cans therein during travel thereof through the processing chambers.

While I have shown and described my invention in connection with a preferred embodiment thereof, it will be appreciated by those skilled in the art, that various modifications and variations may be resorted to without departing from the spirit of my invention. I desire it to be understood, therefore, that I consider myself entitled to all such modification and variations as fall within the scope of the claims appended thereto.

I claim:

1. In an apparatus for processing cans of material having a processing chamber, an endless conveyer for carrying cans through said chamber comprising a pair of spaced apart endless chains, and a carrier for each link of said chain for receiving one or more cans in end to end relation, each carrier including a pair of nested semi-cylindrical members mounted concentric with and for relative pivotal movement about the pivotal axis of corresponding adjacent links of said chains, whereby flexing of corresponding adjacent links of said chains determines the adjustment of each carrier, means for guiding said conveyer past a loading station, means for guiding said conveyer from said loading station into said chamber and in alternately ascending and descending paths through said chamber, means for guiding said conveyer from said chamber past a discharge station, and drive means for said conveyer.

2. A can carrier comprising a link, a second link having a pivotal connection with said first link, and a pair of substantially semi-cylindrical carrier members mounted on said respective links for relative pivotal movement about the axis of said pivotal connection, and with the axis of said members in coincidence with the axis of said pivotal connection.

3. A can carrier comprising a link, a second link having a pivotal connection with said first link, a pair of substantially semi-cylindrical carrier members associated respectively with said links, and a connection between a peripheral part of each mmeber and the link associated therewith to locate said members with their axes in coincidence with the axis of said pivotal connection whereby said carrier members have relative pivotal movement about the axis of said pivotal connection.

4. A can carrier comprising a chain link and a substantially semi-cylindrical carrier member rigidly secured to said link for movement therewith as a unit, said carrier member being disposed in parallel relation to the pivotal axes of said link and projecting on both sides of the plane through said pivotal axes.

5. In an apparatus for processing cans of material, an endless conveyor for carrying cans comprising a pair of spaced-apart flexible support elements and a plurality of can carriers supported therebetween to maintain the same portion of a can carrier in leading position along the path of movement of said support elements, said can carriers being adapted to be actuated to open and closed positions and being supported entirely by said support elements and extending therebetween in the direction of the axis of flexure, and means for guiding said conveyor in alternately ascending and descending paths, whereby the leading portions of said carriers are alternately uppermost and lowermost, said support elements forming the sole actuating means for said carriers.

6. In an apparatus for processing cans of material, an endless conveyor for carrying cans comprising a pair of spaced apart flexible support elements and a plurality of can carriers rigidly connected therebetween, each carrier comprising nested members providing a can loading and discharge opening on one side of said support elements and having relative movement in response to flexing of said support elements to determine the adjustment thereof, and means for guiding said elements in vertical zig-zag paths with the openings facing up when the carriers make turns at the top and the bottom of said zig-zag paths, said guiding means engaging said one side of said support elements at the bottom turns and the other side thereof at the top turns.

7. A can carrier unit comprising a chain link having its ends formed for pivotal connection with adjacent similar links, and a pair of semi-cylindrical carrier members secured to said link intermediate the ends thereof and for movement therewith with their convex surfaces facing each other and with ther respective axes in coincidence with the pivotal axes of said link.

8. A can carrier unit comprising a chain link having its ends formed for pivotal connection with adjacent similar links, and a pair of semi-cylindrical carrier members rigidly secured to said link intermediate the ends thereof with their convex surfaces facing each other and with their respective axes in coincidence with the respective pivotal axes of said link, said members extending to either side of the plane through the pivotal axes of the link.

9. A can carrier comprising a pair of spaced apart chains, a pair of substantially semi-cylindrical carrier members extending between each pair of aligned links of said chains and secured thereto for movement as a unit therewith, each said pair of carrier members having their convex surfaces facing each other and having their respective axes in coincidence with the respective pivotal axes of said aligned links, whereby a substantially cylindrical can carrier unit is provided about each pivotal axis of each of said chains.

10. A can carrier comprising a pair of spaced apart chains, a pair of substantially semi-cylindrical carrier members extending between each pair of aligned links of said chains and secured thereto for movement as a unit therewith, each said pair of carrier members having their convex surfaces facing each other and having their respective axes in coincidence with the respective pivotal axes of said aligned links, whereby a substantially cylindrical can carrier unit is provided about each pivotal axis of each of said chains, the carrier members of each carrier unit being in nested relation for relative rotative movement upon relative pivotal movement of the chain links supporting said carrier members.

11. A can carrier comprising a pair of spaced apart chains, a pair of substantially semi-cylindrical carrier members extending between each pair of aligned links of said chains and secured thereto for movement as a unit therewith, each said pair of carrier members having their respective axes in coincidence with the respective pivotal axes of said aligned links, whereby a substantially cylindrical can carrier unit is provided about each pivotal axis of each of said chains, the carrier members of each carrier unit being in nested relation for relative rotative movement upon relative pivotal movement of the chain links supporting said carrier members, and means for guiding said chains in vertical zig-zag paths to flex said chains in one direction when changing from an upward path to a downward path and to flex said chains in the other direction when changing from a downward path to an upward path.

12. A can carrier comprising a pair of spaced apart chains, a pair of substantially semi-cylindrical carrier members extending between each pair of aligned links of said chains and secured thereto for movement as a unit therewith, each said pair of carrier members having their convex surfaces facing each other and having their respective axes in coincidence with the respective pivotal axes of said aligned links, whereby a substantially cylindrical can carrier unit is provided about each pivotal axis of each of said chains, the carrier members of each carrier unit being in nested relation for relative rotative movement upon relative pivotal movement of the chain links supporting said carrier members, and said carrier members of each carrier unit extending to either side of the respective planes through the pivotal axes of the associated links, with one pair of cooperative edges spaced apart to form a can feeding and discharging opening, the width of the opening being determined by the direction of flexing of said chains and ahe amount of relative pivotal movement between adjacent links of said chains.

13. A can carrier comprising a pair of spaced apart chains, a pair of substantially semi-cylindrical carrier members extending between each pair of aligned links of said chains and secured thereto for movement as a unit therewith, each said pair of carrier members having their convex surfaces facing each other and having their respective axes in coincidence with the pivotal axes of the ends of said aligned links, whereby a substantially cylindrical can carrier unit is provided about each pivotal axis of each of said chains, the carrier members of each carrier unit being in nested relation for relative rotative movement upon relative pivotal movement of the chain links supporting said carrier members, and said carrier members of each carrier unit extending to either side of the respective planes through the pivotal axes of the associated links, with one pair of cooperative edges in overlapping relation in either direction of flexing of said chains and with the other pair of cooperative edges spaced apart to form a can feeding and discharging opening, the width of the opening being determined by the direction of flexing of said chains and the amount of relative pivotal movement between adjacent links of said chains, and means for guiding said chains in vertical zigzag paths with the openings facing up when the carrier units make turns at the top and bottom of said zig-zag paths.

UNITED STATES PATENT OFFICE 2,149,561

PROCESSING APPARATUS

Albert R. Thompson, Los Gatos, Calif., assignor to Food Machinery Corporation, San Jose, Calif., a corporation of Delaware Application April 25, 1936, Serial No. 76,403

16 Claims. (Cl. 198—129)

My invention relates to processing apparatus for canned goods and the like, such as cookers, coolers, and combined cookers and coolers, and more particularly to improved means for conveying cans of materials through the apparatus with a minimum of agitation and with a maximum number of cans in the processing space.

It is a general object of my invention to provide an improved processing apparatus in which a maximum number of cans are conveyed through the apparatus in a simple and efficacious manner and with a minimum of agitation.

Another object of the invention is to provide improved conveying means for apparatus of the character referred to which provides for ready control of the loading and discharge of cans and the like.

Another object of the invention is to provide improved conveying means for apparatus of the character referred to which enables a simple automatic control of the loading and discharge of cans and the like.

Another object of the invention is to provide a conveyer having carriers for containers which have a non-pivoted connection with their supporting chains or the like and which do not require extraneous guideways to complement the carrier action in their course through the apparatus.

Another object of the invention is to provide improved conveying means for apparatus of the character referred to which provides for minimum agitation of the canned goods being handled thereby.

Other objects and various advantages will be apparent from the following description made with reference to the appended drawings, in which Fig. 1 is a side elevation of a combined cooker and cooler embodying my invention, certain parts being broken away to illustrate details of construction.

Fig. 2 is an elevational view of the loading end of the apparatus shown in Fig. 1, the view being partially broken away to illustrate the construction of the conveyer.

Figs. 3 and 4 illustrate details of the carriers of the conveyer, Fig. 3 being a fragmentary plan view of one of the conveyer chains and the carriers connected thereto, and Fig. 4 being a sectional view thereof taken in a plane at a right angle to the axes of the chain link pivots.

For purposes of illustration, my invention is shown as embodied in a processing apparatus comprising a combined cooker and cooler. Generally, the apparatus includes a casing which may be divided into chambers for the pre-heating, heating and cooling steps of a processing operation, and a conveyer which receives cans or the like at a loading station and carries such cans successively through the compartments to a discharge station where the cans are discharged, the movements of the cans being effected with a minimum of agitation. In the illustrated embodiment, an open type cooker is shown, but the invention is equally useful in a pressure cooker.

Figure 1:
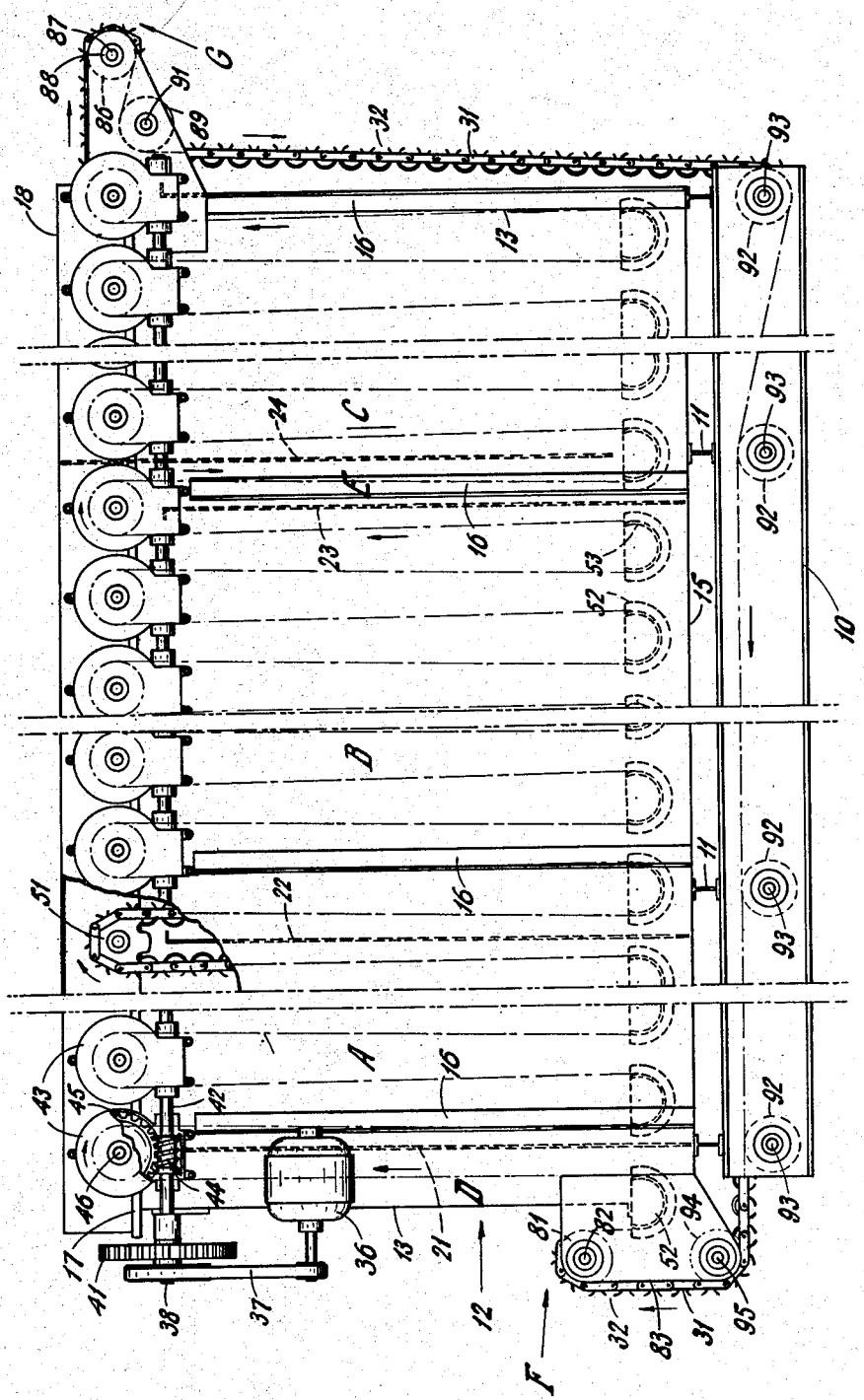

The apparatus includes a base which may be formed by longitudinal channels 10 (Figs. 1 and 2) and transverse I-beams 11 mounted thereon, and on which casing 12 is secured. Casing 12 may be of generally rectangular outline and formed of end, side and bottom walls 13, 14 and 15, respectively, which may be formed of sheet metal and connected by welding or the like. Various bracing angles 16 may be provided for the walls. At the top edges thereof, end and side walls 13, 14 are provided with respective horizontal flanges 17 to support certain parts including cover 18.

The apparatus is shown in the illustrated embodiment thereof as having three chambers A, B and C, respectively, for pre-heating, heating, and cooling the cans conveyed therethrough as described hereinafter, but the number of chambers can be varied if desired in accordance with the type of pasteurizing which is desirable with the material in the cans. To provide the above noted chambers, transverse walls 21, 22 and 23 are secured by welding or the like to bottom wall 15 and side walls 14 and terminate adjacent the upper edges of side walls 14. Chamber A is formed between walls 21 and 22, chamber B between walls 22 and 23, and chamber C between wall 23 and the adjacent end wall 13. Between wall 21 and adjacent end wall 13, entrance passage D is provided, and adjacent wall 23, wall 24 is secured between side walls 14 and extends from adjacent bottom wall 15 beyond side walls 14 and into cooperative sealing relation with cover 18, thereby providing insulating space E between chambers B and C and separating such chambers from heat conducting relation under cover 18. Chambers A, B and C are filled with a suitable medium, such as water, and heat may be applied to the water in chambers A and B by any suitable means.

Cans or containers of the material to be processed are carried by an endless conveyer from a loading station in successive ascending and descending paths through the various processing chambers to a discharge station, from which the emptied conveyer is returned to the loading station. I am aware that this general type of conveyer has been used with buckets or carriers which are pivoted freely to a chain or the like and with which special guide means are associated to control movement of the carriers. However, I have provided an improved conveyer in which adjustable carriers are fixed to the supporting chains or the like and are controlled solely by movement of the conveyer to receive and discharge the cans and in remaining closed to carry the cans through the various treatment phases of the processing operation.

The improved conveyer of my invention includes spaced apart support elements or chains 31 (Figs. 1 and 2) having buckets or carriers 32 secured therebetween in a manner later described, and which are driven over suitable guides, such as sprockets or the like, to determine the path of the conveyer and the open or closed condition of the carriers. The drive for the conveyer includes a source of power which is shown in the illustrated embodiment as a constant speed electric motor 36 suitably mounted on a side wall 14 and having a conventional pulley and belt connection 37 with shaft 38 (Fig. 2) journalled in a suitable bearing on an end wall 13 and carrying small gear 39 meshing with large gear 41 on longitudinally extending shaft 42. Shaft 42 (Fig. 1) is journalled in and may be supported by a plurality of similar gear housings 43 and within each housing 43 carries worm 44 engaged with worm wheel 45 on an associated transverse shaft 46. Each shaft 46 is mounted by spaced bearings 47 (Fig. 2) secured on flanges 17 of side walls 14, and is journalled in and may support the associated housing 43 adjacent each of bearings 47. Each shaft 46 carries a driving sprocket 51 (Figs. 1 and 2) adjacent each end thereof for driving engagement with respective chains 31. At their lower ends, chains 31 (Fig. 1) are guided by a plurality of similar guide devices, each of which may comprise a guide element 52 suitably secured on a side wall 14 and having semi-circular flange 53 forming a semi-circular path to receive the associated chain 31.

As chains 31 are similar in construction, and as carriers 32 are similar in construction and similarly connected to chains 31, only one chain 31, one carrier 32 and their connection will be described. Chain 31 (Figs. 3 and 4) includes a plurality of links composed of spaced apart straps 61, 62 apertured adjacent their ends to receive pivot pins 63 journalled therein and in spacer bushings 64. Straps 62 which are at the inner side of the chain when assembled in the apparatus are connected to telescoped carrier members, which are preferably of substantialy semi-cylindrical shape, and each cooperating pair of which forms an adjustable carrier with the respective members mounted for relative pivotal adjustment about a common axis. Each carrier, therefore, is of generally cylindrical shape to receive a plurality of cans placed therein in end to end relation. A fastening element or lug 71 coextensive with the width of a strap 62 projects from each strap 62 adjacent the midpoint thereof, being fixedly secured thereto as by welding.

Each lug 71 is provided with opposite concave surfaces 72, 73 for connection as by welding with respective substantially semi-cylindrical carrier members 76, 77 of adjacent carriers 32 adjacent longitudinal edges of members 76, 77. Member 77 is of smaller radius than member 76 to provide the telescoped relation thereof and the associated lugs 71 are so positioned that both members 76, 77 are concentric with respect to the axis of the adjacent pivot pin 63. Thus, carrier members 76, 77 which are concentric with the same pivot pin 63, are mounted for relative pivotal movement as the associated adjacent links of a chain 31 pivot in passing around a sprocket or guide, and such relative pivotal movement is utilized in determining the open or closed condition of the carriers, as described hereinafter.

Figure 5:
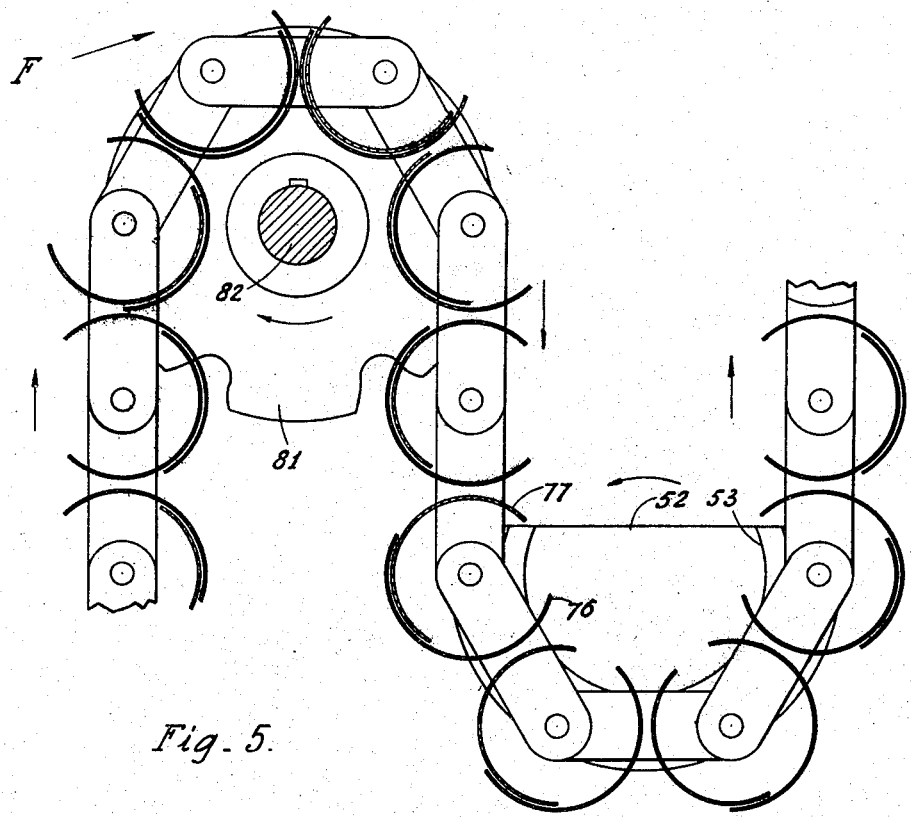
Figs. 5 and 6 are fragmentary vertical sectional views illustrating more or less schematically the operation of the carriers of the conveyer at the loading and discharge stations therefor, respectively.

The path of the conveyer leads from loading station F (Fig. 1) where cans may be placed in each carrier 32 in end to end relation by any suitable means as chains 31 pass over a pair of loading sprockets 81 (Figs. 1, 2 and 5) secured adjacent the ends of transverse shaft 82. Shaft 82 is journalled adjacent its ends in brackets 83 (Figs. 1 and 2) secured as by welding to respective side walls 14 and projecting beyond end wall 13. From loading sprockets 81, carriers 32 travel downwardly and around end guide members 52 through an opening at the bottom of end wall 13 and up through entrance passage D, over end sprockets 51 above wall 21 and into pre-heating chamber A. In chamber A, carriers 32 move in successive descending and ascending paths as determined by sprockets 51 and guides 52 a period of time determined by the size of chamber A and the speed of conveyer.

In leaving pre-heating chamber A, carriers 32 are guided by chains 31 passing over sprockets 51 above wall 22 and move into heating chamber B where they move up and down through paths determined by the engagement of chains 31 with sprockets 51 and guide members 52 for the desired period of time determined by the size of heating chamber B and the speed of the conveyer.

In leaving heating chamber B, chains 31 pass over sprockets 51 above wall 23 to guide the carriers into insulating passage E between walls 23 and 24, through which the carriers move downwardly and then under wall 24 into cooling chamber C as chains 31 are guided by guide members 52, immediately below wall 24. Carriers 32 move up and down through cooling chamber C for the desired time interval, and then are guided out the open discharge end of cover 18 by the engagement of chains 31 with sprockets 51 at the discharge end of the apparatus and along a horizontal path to discharge station G.

Figure 6:
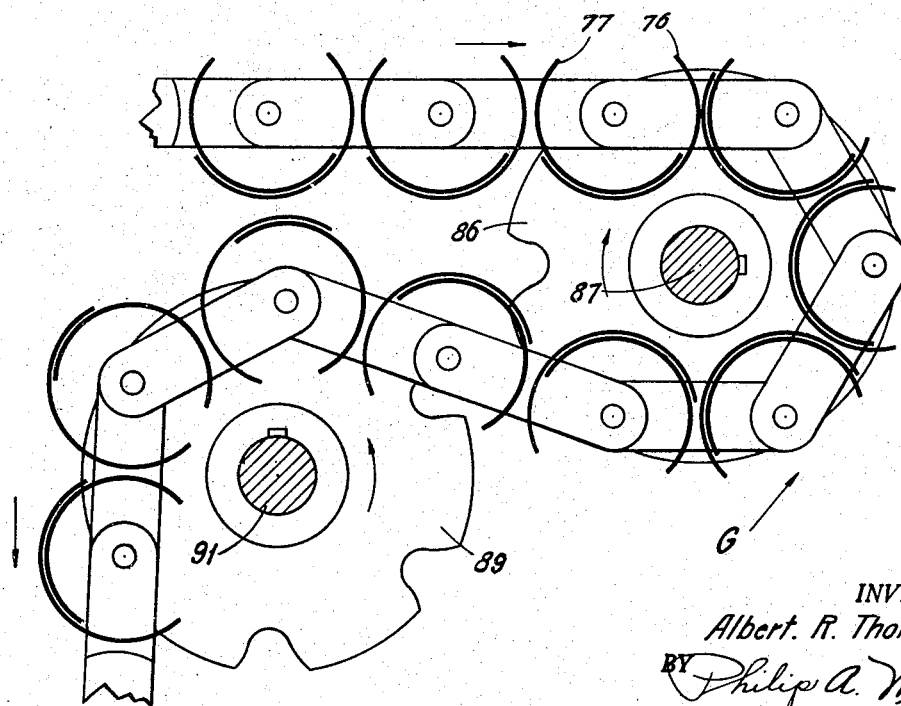

Discharge station G is provided by a pair of discharge sprockets 86 (Figs. 1 and 6), only one of which is seen in the drawings, mounted adjacent the ends of shaft 87 which is journalled at its ends in similar spaced brackets 88 (Fig. 1) secured as by welding at the top of side walls 14.

As chains 31 (Fig. 1) move around discharge sprockets 86, carriers 32 are adjusted automatically as described hereinafter to discharge the cans therefrom onto any suitable can receiving means. From discharge station G, carriers 32 are returned to loading station F through a path determined by the engagement of chains 31 with idler sprockets 89 on shaft 91 mounted in brackets 88, with a plurality of sets of idler sprockets 92 on shafts 93 mounted in channels 10, and with a 14. A can carrier comprising a pair of spaced apart chains, a series of substantially cylindrical carrier units extending between said chains with their axes in coincidence with the pivotal connections between adjacent links of said chains, each unit including nested members rigidly connected between adjacent pairs of links of said chains to provide a can loading and discharge opening on one side of said chains, and means for guiding said chains in vertical zig-zag paths with the openings facing up when the carrier units make turns at the top and bottom of said zig-zag paths.

15. A can carrier comprising a pair of spaced apart chains, a series of substantially cylindrical carrier units extending between said chains with their axes in coincidence with pivotal connections between adjacent links of said chains, each unit including nested members rigidly connected between adjacent pairs of links of said chains to provide a can loading and discharge opening on one side of said chains, means for guiding said chains past a loading station and to flex said chains to enlarge said openings while facing upwardly, means for guiding said chains in vertical zig-zag paths with the openings facing up when the carrier units make turns at the top and bottom of said zig-zag paths, and means for guiding said chains past a discharge station and to flex said chains to enlarge said openings while facing downwardly.

16. A can carrier comprising a pair of spaced apart chains, a series of substantially cylindrical carrier units extending between said chains with their axes in coincidence with pivotal connections between adjacent links of said chains, each unit including nested members rigidly connected between adjacent pairs of links of said chains to provide a can loading and discharge opening on one side of said chains, and means for guiding said chains past a discharge station including means for reversing the direction of travel of said chains to enlarge said openings while facing downwardly.

ALBERT R. THOMPSON.